United States Patent
Ullein et al.

[11] Patent Number: 5,967,922
[45] Date of Patent: Oct. 19, 1999

[54] TENSIONING DEVICE FOR A CONTROL GEAR

[75] Inventors: Thomas Ullein, Stegaurach; Bolko Schuseil, Adelsdorf, both of Germany

[73] Assignee: INA Wälzlager Schaeffler OHG, Herzogenaurach, Germany

[21] Appl. No.: 09/029,237

[22] PCT Filed: Aug. 9, 1996

[86] PCT No.: PCT/EP96/03536

§ 371 Date: Mar. 20, 1998

§ 102(e) Date: Mar. 20, 1998

[87] PCT Pub. No.: WO97/13081

PCT Pub. Date: Apr. 10, 1997

[30] Foreign Application Priority Data

Sep. 30, 1995 [DE] Germany .................. 195 36 643

[51] Int. Cl.⁶ .................................................. F16H 7/08
[52] U.S. Cl. .................................. 474/111; 474/140
[58] Field of Search .................... 474/111, 110, 474/109, 101, 135, 112, 140

[56] References Cited

U.S. PATENT DOCUMENTS

| | | | |
|---|---|---|---|
| 389,835 | 9/1888 | Cooley | 474/111 |
| 2,129,107 | 9/1938 | Taylor | 474/110 |
| 2,210,276 | 8/1940 | Bremer | 474/111 X |
| 2,791,910 | 5/1957 | Eckley . | |
| 3,817,114 | 6/1974 | Klee . | |
| 3,869,138 | 3/1975 | Allison | 474/109 X |
| 3,964,331 | 6/1976 | Oldfield | 474/110 |
| 4,850,934 | 7/1989 | Gibson, Jr., et al. . | |
| 5,222,917 | 6/1993 | Shimaya et al. | 474/101 |
| 5,606,941 | 3/1997 | Trzmiel et al. | 474/111 X |

FOREIGN PATENT DOCUMENTS

| | | |
|---|---|---|
| 0 343 136 A1 | 11/1989 | European Pat. Off. . |
| 24 31 425 A1 | 1/1976 | Germany . |
| 40 28 756 C1 | 3/1992 | Germany . |
| 1 206 705 | 9/1970 | United Kingdom . |
| 2 254 670 | 4/1992 | United Kingdom . |

OTHER PUBLICATIONS

Patent Abstract of Japanese Patent 59–20850(A).

*Primary Examiner*—Tamara L. Graysay
*Assistant Examiner*—Marcus Charles
*Attorney, Agent, or Firm*—Akin, Gump, Strauss, Hauer & Feld, L.L.P.

[57] ABSTRACT

A tensioning device for the chain (3) of an internal combustion engine, for example of a control gear, comprises a guide rail (8), a pivoted tension lever (15) and a tension element (13) which exerts a tensioning force on the sliding block (18) through a compression spring (14). According to the invention, two sliding blocks (17, 18) acting in different directions on the chain (3) are arranged on the tension lever (15) which has a fixed axis of pivot (16). The device of the invention can thus be used in a very small mounting space and is able to compensate large chain elongations.

18 Claims, 3 Drawing Sheets

TENSIONING DEVICE FOR A CONTROL GEAR

FIELD OF THE INVENTION

The invention concerns a tensioning device for the chain or the toothed belt of a camshaft drive of an internal combustion engine comprising a guide rail for guiding the chain or the toothed belt in the tensioned portion thereof, a pivoted tension lever for transmitting the pre-tension by acting on the slack portion of the chain or the toothed belt and a tension element which exerts a tensioning force on the tension lever through a compression spring.

BACKGROUND OF THE INVENTION

Modern internal combustion engines with unchanged or even enhanced performances are being constructed with ever decreasing outer dimensions. Besides this, due to the employment of multi-valve techniques, more and more engines have an increasing number of camshafts. This results in a considerable reduction of the design space disposable for the control gear. Many known tensioning devices are too large and therefore not usable.

Tensioning devices are known from the documents GB,A, 1 206 705 and DE,C, 3 623 903. In the device of the latter document, a tensioner housing for lodging the tension element, a guide rail for the chain and a pivoted sliding block are arranged separately from one another on the engine casing. The space requirement of this tensioning device is therefore considerable and its assembly complicated.

SUMMARY OF THE INVENTION

The object of the invention is to create a tensioning device for a control gear which is usable in a very small mounting space and can compensate a large chain elongation.

The invention achieves this object by the fact that two sliding blocks acting in different directions on the chain or the toothed belt are arranged on the tension lever which has a fixed axis of pivot. In this way, due to the two sliding blocks arranged behind each other and acting in opposite directions, the tensioned region of the chain tensioned by the tension lever acquires a slightly sinusoidal shape with only small deflections.

The axis of pivot of the tension lever can be arranged on the bearing cap of the bearing of a camshaft. However, it is also possible to arrange the axis of pivot of the tension lever, i.e. its fulcrum, on the guide rail or at another point on the engine. The guide rail can be arranged in the cylinder head of the internal combustion engine and can be fixed there detachably by screws. In this case, the entire tensioning device can be fixed as one single unit at two screwing points on the engine so that a quick and simple mounting is assured.

The tension element can be arranged in a tensioner housing formed on the guide rail. The guide rail and/or the tension lever can be configured as metal elements. If an aluminium alloy is used for this purpose, the advantage of a very light structure is obtained.

A slide lining of a polymeric material for the chain can be applied to the guide rail and the sliding blocks for the chain can likewise be made of a polymeric.

BRIEF DESCRIPTION OF THE DRAWINGS

Examples of embodiment of the invention are represented in the drawings and will be described more closely below. The drawings show.

DETAILED DESCRIPTION OF THE DRAWINGS

Figure 1:
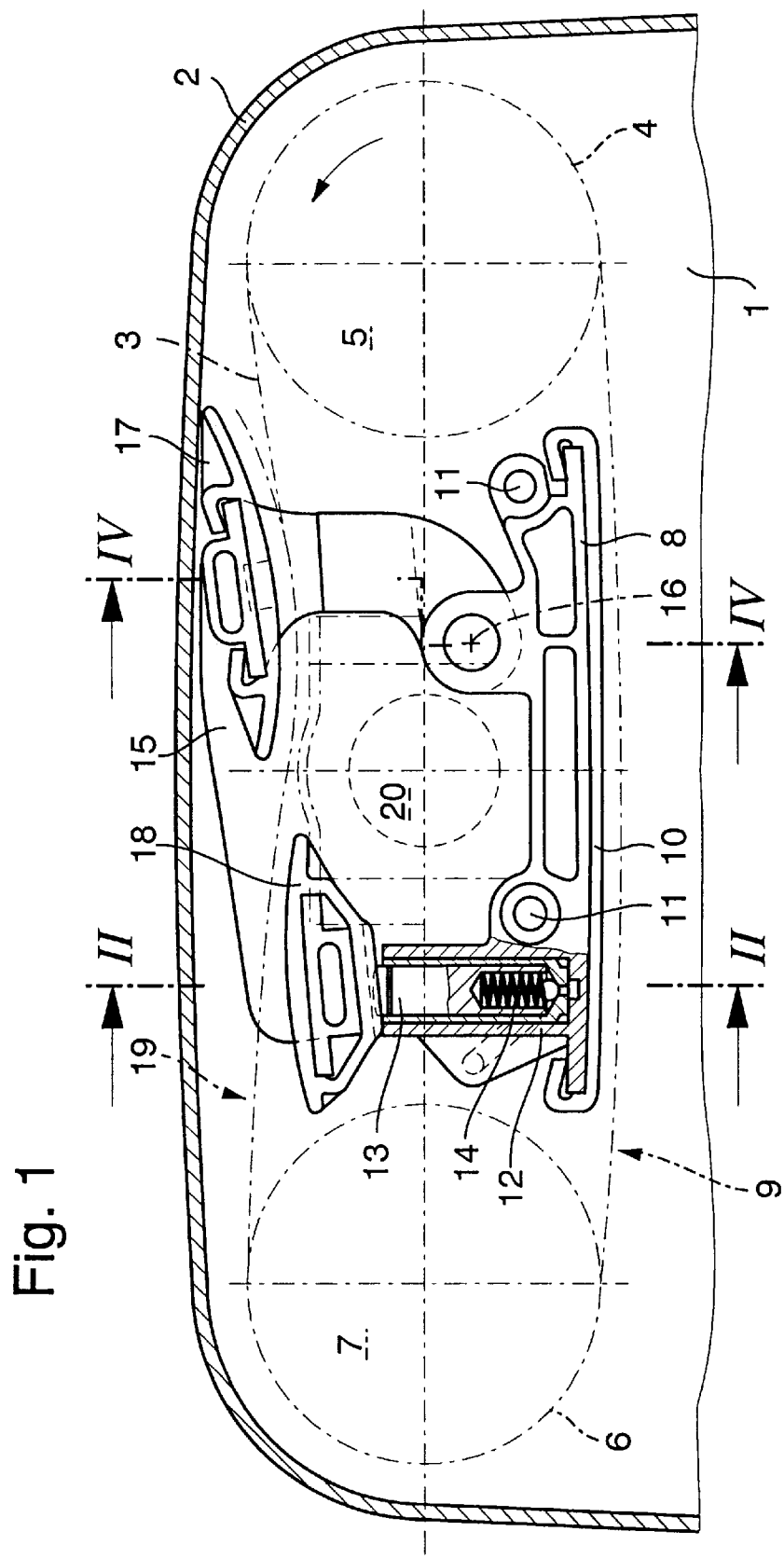
FIG. 1, a tensioning device installed in the cylinder head of an internal combustion engine, comprising a tension lever which is pivoted on a fixed guide rail.

A tensioning device of the invention shown in FIG. 1 is installed in a cylinder head 1 of an internal combustion engine. The installing space is closed in outward direction by a cylinder head cover 2. The function of the tensioning device is to produce a pre-tension in a chain 3 which is slung around a chain pulley 4 of a first camshaft 5 and a chain pulley 6 of a second camshaft 7. The chain pulley 4 is driven by the crankshaft via a further chain drive, not shown, so that this chain pulley 4 is the driving pulley for the chain 3 and the chain pulley 6 is the driven pulley.

The tensioning device comprising a guide rail 8 situated in the vicinity of the tensioned portion 9 of the chain 3 is arranged between the chain pulleys 4 and 6. A slide lining 10 provided on the side of the guide rail 8 facing the tensioned portion 9 of the chain 3 prevents a transverse vibration of the chain 3 during operation. The guide rail 8 is configured as a light-weight body and detachably fixed on the cylinder head 1 by two screws 11.

A tension element 13 is lodged in a cylindrical tensioner housing 12 formed on the guide rail 8. By virtue of its compression spring 14, the tension element 13 indirectly exerts a force on a tension lever 15 which is pivoted on an axis of pivot 16 on the guide rail 8. A first sliding block 17 and a second sliding block 18, both made of a plastics material, are affixed one behind the other in chain running direction on the tension lever 15. The sliding blocks 17 and 18 are arranged so as to act on the chain 3 on the slack portion 19 thereof, the sliding block 17 acting on the outer side of the chain 3 and the sliding block 18 on the inner side of the chain 3 seen in relation to the chain pulleys 4 and 6. The application of tensioning force by the tension element 13 on the tension lever 15 is effected in that a piston of the tension element 13 which can extend out of the tensioner housing 12 presses against the bottom surface of the second sliding block 18 facing away from the chain 3 so that the upper surface of the sliding block 18 facing the slack portion 19 of the chain 3 presses the chain 3 towards the outside of the chain drive. By virtue of the connection existing through the tension lever 15, the first sliding block 17 simultaneously presses the slack portion 19 of the chain 3 at another point towards the inside of the chain drive. Due to these opposed movements of the sliding blocks 17 and 18, a relatively large chain elongation can be compensated whereby the chain 3 acquires a slightly sinusoidal shape in its slack portion 19 while being only slightly displaced in other portions. The shape of the chain is therefore only slightly different from that of a non-elongated chain.

If tensioning were to be done using only one sliding block, the required tensioning displacement of this sliding block would be much larger. If the chain were tensioned only towards the outside, i.e. upwards, it would graze the cylinder head cover 2. If tensioning were effected only towards the inside, i.e. downwards, the chain 3 would be deflected to such an extent that it would not be possible to arrange any other components in this space. The invention, in contrast, permits the arrangement of a third camshaft 20 with its bearing in the space delimited on one side by the tensioner housing 12 and the sliding block 18 and on the other side by the tension lever 15 and the sliding block 17 without a detrimental effect on said third camshaft 20 or its bearing during tensioning of the chain and deflection thereof. This third camshaft 20 can be part of a further control gear, not shown.

Figure 2:
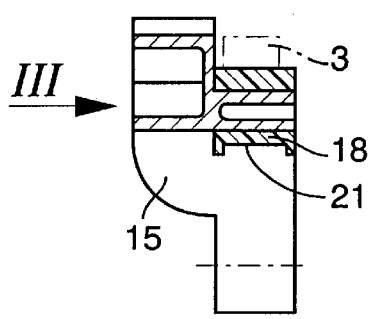
FIG. 2, a section through the tension lever along line II—II of FIG. 1.
Figure 3:
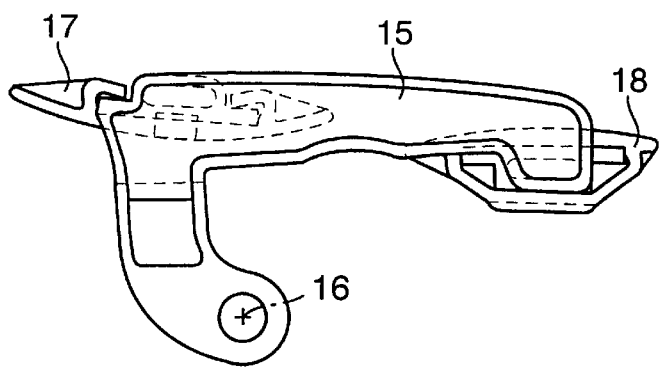
FIG. 3, a view of the tension lever following the direction of the arrow III—III of FIG. 2.

A stop surface 21 on the sliding block 18 on its side facing away from the chain 3 can be seen in FIG. 2. It is against this surface 21 that the piston of the tension element 13 producing the tensioning force bears. Because the sliding block is made of a plastics material, noise generation on this stop surface is kept at a low level.

Figure 4:
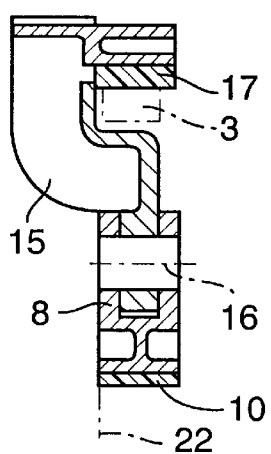
FIG. 4, a section through the guide rail and the tension lever mounted thereon, along line IV—IV of FIG. 1.
Figure 5:
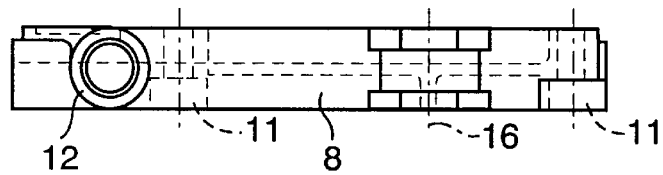
FIG. 5, a top view of the guide rail.

FIG. 4 shows the screwing plane 22 of the guide rail 8 for fixing it in the cylinder head 1.

Figure 6:
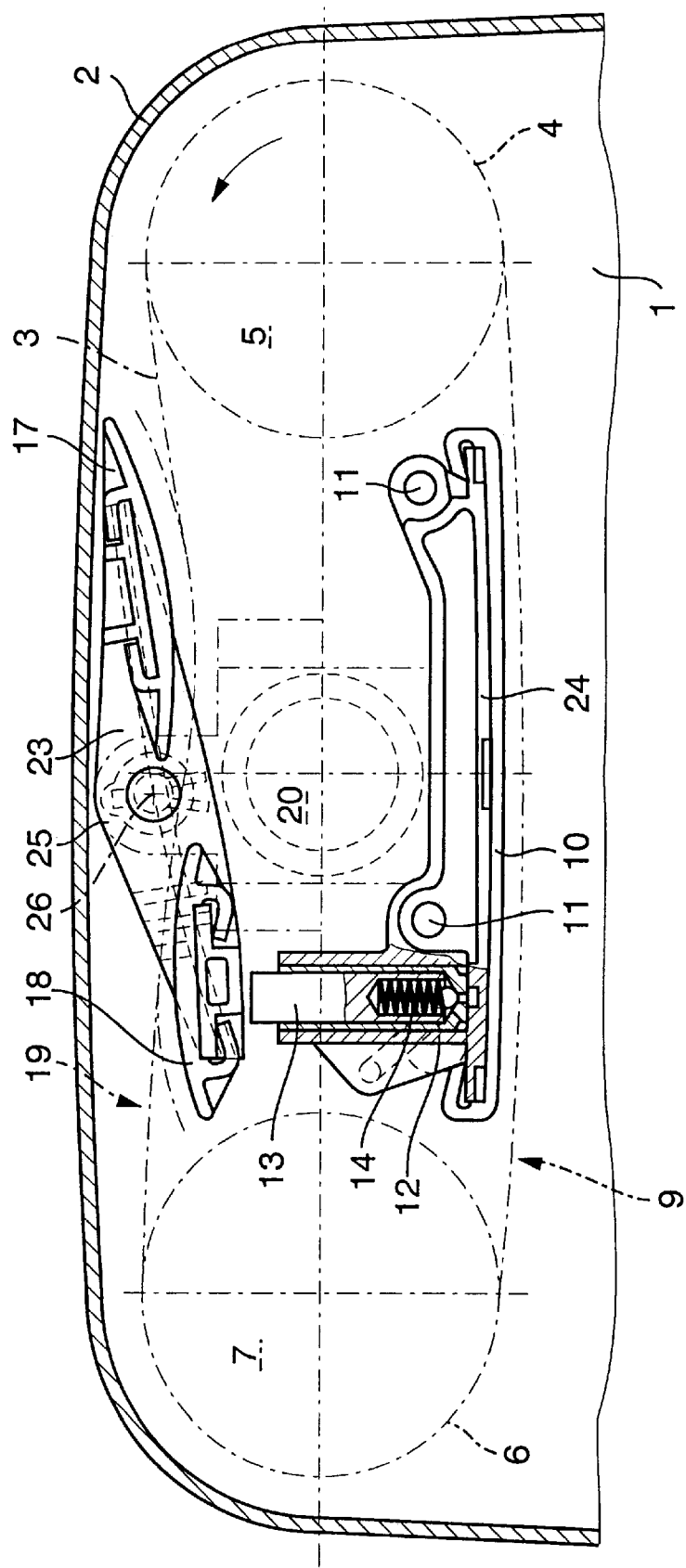
FIG. 6, a further embodiment of the tensioning device, mounted in the cylinder head of the internal combustion engine with the tension lever mounted separately from the guide rail.

The embodiment of the tensioning device shown in FIG. 6 has basically the same configuration as the embodiment of FIGS. 1 to 5 with the difference that the tension lever 23 is not pivoted on the guide rail 24 but on a bearing cap 25 of a bearing of the third camshaft 20. The axis of pivot 26 of the tension lever 23 is situated on this bearing cap 25. Thus it is equally possible to have the sliding blocks 17 and 18 act on the two sides of the chain 3 using a common tension lever 23 which is not mounted directly on the guide rail 24 and still have the tensioning force exerted by the tension element 13 which is retained on the guide rail 24.

We claim:

1. A tensioning device for a chain (3) or a toothed belt of a camshaft drive of an internal combustion engine comprising a guide rail (8,24) situated in the vicinity of a tensioned portion (9) of the chain (3) or the toothed belt for guiding the chain (3) or the toothed belt in the tensioned portion thereof, a pivoted tension lever (15,23) for transmitting a pre-tension by acting on the slack portion of the chain (3) or the toothed belt and a tension element (13) which exerts a tensioning force on the tension lever (15, 23) through a compression spring (14), wherein two sliding blocks (17, 18) acting in different directions opposite sides of the chain on the chain (3) or the toothed belt on the slack portion (19) thereof are arranged on the tension lever (15,23) which has a fixed axis of pivot (16,26) located along the tension lever (15,23).

2. A tensioning device of claim 1 wherein the axis of pivot (26) of a tension lever (23) is arranged on a bearing cap (25) of the bearing of a camshaft (20).

3. A tensioning device of claim 1 wherein the axis of pivot (16) of the tension lever (15) is arranged on the guide rail (8).

4. A tensioning device of claim 1 wherein the guide rail (8, 24) is arranged in the cylinder head (1) of the internal combustion engine and fixed thereon detachably by screws (11).

5. A tensioning device of claim 1 wherein the tension element (13) is arranged in a tensioner housing (12) formed on the guide rail (8, 24).

6. A tensioning device of claim 1 wherein at least one of the guide rail (8, 24) and the tension lever (15, 23) is configured as a metal or a plastic element.

7. A tensioning device of claim 6 wherein at least one of the guide rail (8, 24) and the tension lever (15, 23) is made of an aluminium alloy.

8. A tensioning device of claim 1 wherein a slide lining (10) of a polymeric material for the chain (3) is applied to the guide rail (8, 24).

9. A tensioning device of claim 1 wherein the sliding blocks (17, 18) for the chain (3) are made of a polymeric material and slipped onto the tension lever (15, 23).

10. A tensioning device for either one of a chain (3) and a toothed belt of a camshaft drive of an internal combustion engine, comprising:

a guide rail (8, 24) positioned along and abutting a tensioned portion of either one of the chain and the toothed belt;

a tension lever (15, 23) having a fixed axis of pivot and transmitting a tensioning force;

a tension element (13) attached to the guide rail and engaging said tension lever, said tension element exerting the tensioning force on the tension lever (15, 23); and two sliding blocks (17, 18) attached along the tension lever and abutting different sides of either one of the chain (3) and the toothed belt along a slack portion.

11. A tensioning device of claim 10, wherein the fixed axis of pivot (26) of the tension lever (23) is arranged on a bearing cap (25) of a bearing of a camshaft (20).

12. A tensioning device of claim 10, wherein the fixed axis of pivot (16) of the tension lever (15) is arranged on the guide rail (8).

13. A tensioning device of claim 10, wherein the guide rail (8, 24) is detachably fastened in the cylinder head (1) of the internal combustion engine.

14. A tensioning device of claim 10, wherein the tension element (13) exerts a force via a compression spring arranged in a tensioner housing (12) formed on the guide rail (8, 24).

15. A tensioning device of claim 10, wherein at least one of the guide rail (8, 24) and the tension lever (15, 23) is configured as either one of a metal element and a plastic element.

16. A tensioning device of claim 15, wherein at least one of the guide rail (8, 24) and the tension lever (15, 23) is made of an aluminium alloy.

17. A tensioning device of claim 10, wherein a lining (10) of a polymeric material is attached to a surface of the guide rail (8, 24) that abuts the chain (3).

18. A tensioning device of claim 10, wherein the two blocks (17, 18) are made of a polymeric material.

* * * * *